March 7, 1944.  N. WAHL  2,343,349
SEPARABLE FASTENER
Filed Nov. 5, 1941
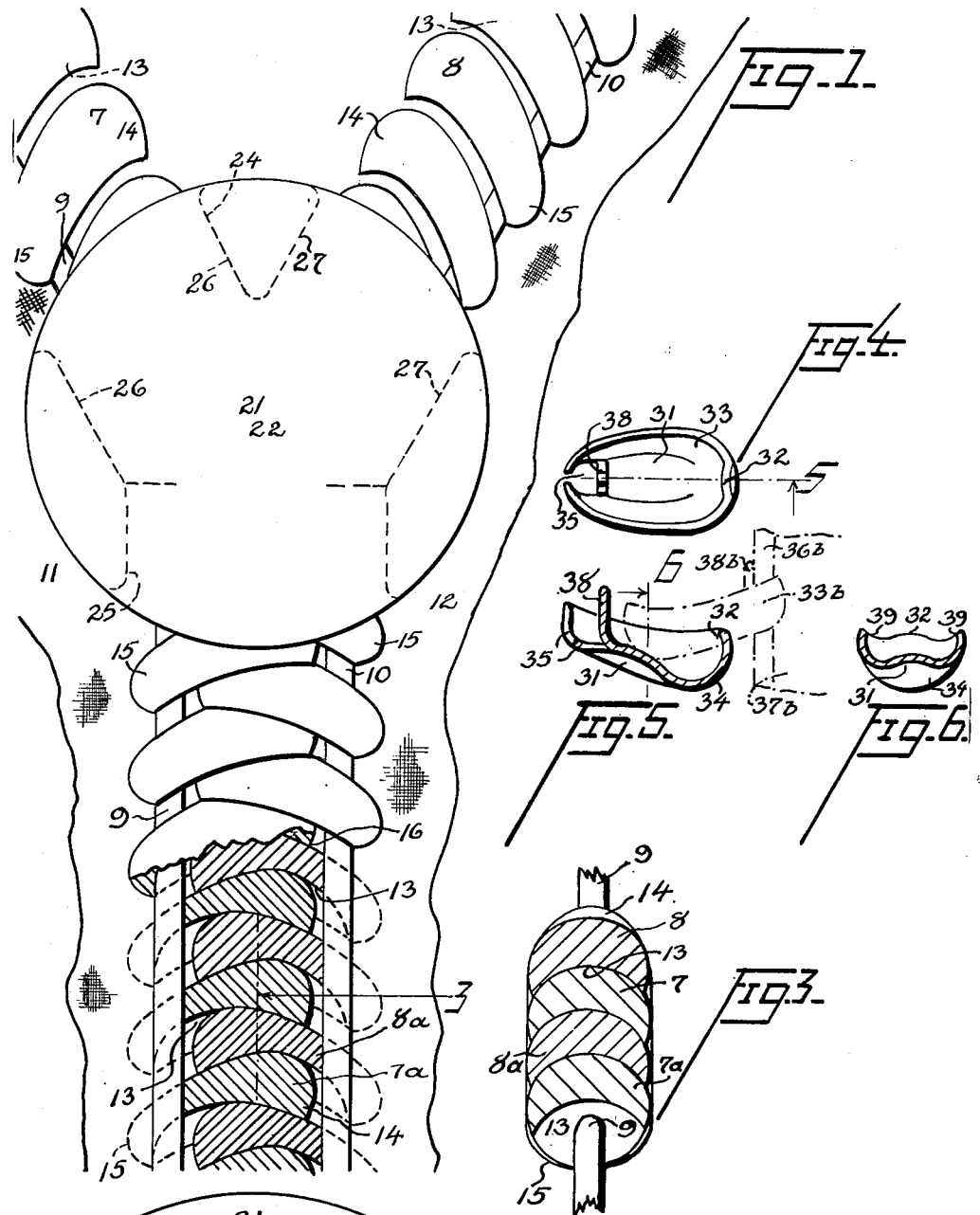
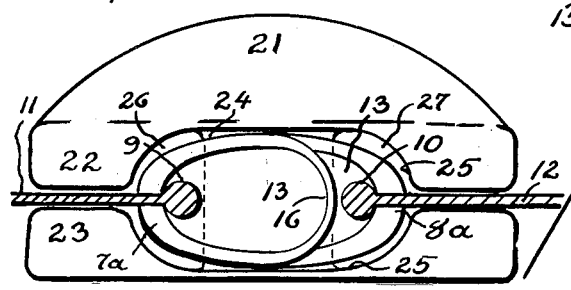
NICOLAS WAHL.
INVENTOR.

Patented Mar. 7, 1944

2,343,349

UNITED STATES PATENT OFFICE 2,343,349

SEPARABLE FASTENER

Nicolas Wahl, New York, N. Y.

Application November 5, 1941, Serial No. 417,938

22 Claims. (Cl. 24—205)

My invention relates to an improvement in separable fasteners. Under the term separable fastener I understand a device for coupling and uncoupling materials along a parting line and comprising rows of links arranged upon the material to be coupled, e. g. along one or more edges of leather, fabric or the like, or along tapes to be fastened to the material to be coupled, and a slider which may engage and be moved upon said rows of links and serves to guide them into an overlapping position of mesh in which they interlock, or to uncouple them from such an interlocked position.

If such a separable fastener is to be termed serviceable and to fulfill standard requirements, the links thereof must interlock in the coupled position, so that the fastener does not yield when the goods coupled thereby are transversely pulled apart unless the links are damaged or destroyed and thereby are thus rendered unfit to serve their purpose thereafter. In other words there must be a positive interlock.

Heretofore it had been considered a general requirement of such separable fastener, that the links are provided with hook formations, eye formations or both, so that the hooks of a link of one of the rows engage in the eye of a link of the other row, and the adjacent links provide the lateral thrust preventing the hook from disengaging from the eye.

In my companion application Serial No. 335,365 of May 5, 1940, now Patent No. 2,300,443, granted November 3, 1942, entitled Separable fastener, of which this application is a continuation in part, I have illustrated a novel principle, under which loops or rings may be shaped to serve as links of a separable fastener, the links of the two rows extending at an angle into each other and nestling within each other in the coupled position, so that they are positively interlocked.

According to this invention links thus interlocked or adapted for such interlocking do not necessarily have to have the form of loops or rings, but they may have some other shape, such as that of lugs or shells of a very simple and smooth contour. Lacking the pronounced hook formation which heretofore has been so characteristic on separable fastener, the links or lugs of a fastener of my invention also lack the precisely defined, "mechanical" appearance which must go with such a formation of the links. At the same time fasteners of this invention also lack the weak points which the hooks or eyes heretofore represented on such links and at which points such links were therefore notoriously subject to wear and tear.

It is another object to arrange such links in consistency with the flexibility of the goods, and in that respect an ovoidal or hemi-ovoidal shape, transversely oblate or dented perhaps, is an ideal solution, more particularly as to the operation of the outer portion of a link, whereas, of course, a certain freedom as to shape is to be given at a point where such link is attached to or arises from the goods, because the link is naturally bifurcated at that point and quite often struck flat. Said first contour of a link of this invention follows, for instance, that of a flattened ovoid as frequently presented by a well ground and smooth pebble by the sea.

There is preferably no outside projection on a body of that shape at all—bearing in mind the reservation made above concerning the arrangement for fastening the links upon the tapes or goods—but a link of one row fits angularly into a link of the other row, and for that purpose it juts angularly into the underside of a link of the other row, and for like purpose there is a recess upon the underside of each link, in which recess a link of the other row is seated or socketed in the coupled position of the separable fastener.

In order to best accommodate such a recess upon the bottom side and in order to offer a strong marginal portion around the recess it may be desirable to shape the link irregularly, e. g. as half of an ovoid, the section being taken more or less along the two longer axes of an oblate ovoid. But since the outer periphery of such a hemi-ovoid will for practical purposes again be rounded off, and bearing in mind that it will recess upon the underside, there is, in principle, very little difference between the half and the full ovoid as the starting point.

It is desirable, that the front edge of the recess on the underside of a link follow and hug closely around another link jutting thereinto from the underside, where there is an acute angle between the two links. But aside from that there is little limitation concerning the shaping of the recess upon the underside of the link. There must of course be room for the link of one row to swing out of the recess in a link of the other row, when the two rows are uncoupled by a slider. The convex surface of one link may spherically register with the major portion of the recess of the other link, in which case the rows; the links being coupled in ball socket fashion, will still offer sufficient flexibility for practical purposes, i. e. will permit the fastener as a whole to be kinked longitudinally and to be flexed transversely.

On the other hand, once we have abided by the requirement that the front edge of the bottom recess of a link encircle and preferably socket the head of another link resting thereon, the balance of the recess may be shaped ad libitum. For instance the link may be hollowed out by said recess, leaving only a comparatively thin shell, which shell will still be found to be extremely durable and serviceable, because it is curvilinear and continuous. It is of course within the knowledge of those acquainted in this art to reinforce the edge of said shell, e. g. by a head, if so found desirable.

The one relative movement primarily to be preserved between adjacent, coupled links is substantially around an axis in the plane of the coupled goods and normal to the direction in which the links are arrayed. Concerning two links of the other row, between which a link is coupled, movement should therefore be allowed around relatively substantial axes, respectively. The cross-section of a link is therefore, normal to its main axis, preferably substantially elliptical, more particularly on its contacting upper side.

The links of both rows may be similar and the rows of links may be alike or symmetrical, being, of course, relatively offset to half the lead of the respective links. The lead between the links of a row is preferably less than twice their overall width in that direction at the coupling point. As a matter of fact the links should be spaced as close together as possible, making allowance, of course, for the flexibility generally desired in a fastener and for a swinging through the curve of the slider.

While the operative portion of the link, i. e. the portion thereof extending between the goods or tapes to be linked thereby should be at an incline—in the same direction as to both of the rows—the links may extend in a normal direction onto the respective tapes or goods. But generally I prefer to incline the links as a whole, because that yields a simpler form and is also conducive to a smooth coupling and uncoupling of the slider.

Links of this invention may be incorporated or mounted upon the goods or tapes in the various manners known in the prior art, i. e. they may form part of those tapes, they may be mechanically fastened thereon by clamping, striking, riveting, hooking, sewing etc., or they may be formed in a plastic thereon, or cast thereonto in a low-melting point metal, or they may be suitably strung end to end onto the edge or bead of a tape.

Embodiments by which the invention is to be illustrated but not limited, are shown in the accompanying drawing, in which:

Fig. 1 is a front view of a separable fastener comprising a slider and applied to two pieces of goods partly coupled by the slider. At the bottom of the view the links are centrally cross-sectioned.

Fig. 2 is a corresponding bottom view showing the links locked by the slider. In reference to the view of Fig. 1 the links below link 7a are omitted.

Fig. 3 is a central cross-section taken normal to the plane of goods, to which the fastener is attached. It shows only four of the links, starting up from link 7a, the view being taken in the manner indicated by a dot-dash line, an arrow and the numeral 3 in Fig. 1.

The remaining figures illustrate the invention by way of a modification.

Fig. 4 is the top view of a modified embodiment.

Fig. 5 is a corresponding cross-sectioned side view taken at the level and in a direction pointed out at 5 in Fig. 4. Dot dash lines identified by numerals having the sub-indices b show a link of the opposite stringer allocated in a coupled position.

Fig. 6 is a corresponding cross-sectioned end view taken at a plane and in the direction pointed out by a dot-dash line, an arrow and the numeral 6 in Fig. 5.

The features illustrated in the embodiments of the drawing are, of course, mutually transferable or exchangeable.

Similar numerals refer to similar parts throughout the various views:

Within the lee-way offered under the principle enunciated by the particular statements of invention hereinabove, and also from an aesthetic point of view, the links 7 and 8, as lugs in the embodiment of Figs. 1–3, have a shape lending to the coupled separable fastener the appearance of a braid. Lugs 7 and 8 are mounted along the edges of goods 11 and 12, e. g. on beads 9 and 10 forming the selvages of such goods or tapes, respectively.

The lugs may, for instance, be shaped in a heading operation with a bifurcation where they are to be attached to the goods or tapes, are fed by a hopper onto the edges of such goods or tapes, and the bifurcated ends are struck over the beads 9 and 10. The lugs should preferably be inclined on the two pieces of goods or tapes relatively to the edges thereof in opposite directions pointing the same way as to the parting line, the drawing showing the front ends of the lugs to extend at similar angles upwards. Lugs of a metal of low melting point or of a suitable plastic material may be cast or otherwise formed on the edges of the goods. Methods for carrying out the several operations just mentioned are well known. The smaller ends 17 of the ovoidal lugs 7 and 8 being mounted upon the goods or tapes, the larger preferably blunt heads at the other ends project angularly into a concavity on the bottom side of a link of the opposite row of lugs, e. g. the front, convex end 14 of links 7a nestles in the cavity 13 provided on the bottom side of link 8a. For a particularly snug nestling the convexity of a head 14 and the concavity 13 may match each other as to a circular transverse cross-section (Fig. 3) and even in a spherical sense. That may lead to actual fulcruming in ball socket fashion, permitting swinging around a longitudinal axis along the line of coupling, i. e. the goods being hinged upon each other at such longitudinal axis, but transverse flexibility, e. g. a kinking of the fastener in a direction extending in the goods normal to the longitudinal extent of the fastener is the primary object. However for the latter purpose a line contact along the front edge 16 of the cavity of one link with the blunt head of another link jutting into said cavity may be sufficient to procure, as one particular reduction, the nestling peculiar to this invention. The remainder of the concavity may therefore take any desired form. For purposes of economy and in order to allow the links to be made in a thin foil of sheet material, e. g. metal, the links may be completely hollow shells, as hereinafter illustrated in the embodiment of Figs. 4–6.

Any slider of the known construction may be converted for use in connection with the instant invention, the drawing illustrating, for instance, a fancy button 21 for such purpose. The top part 22, which is shown to bulge out in order to facilitate manipulation, and the bottom part 23 of the button are spacedly interconnected by a bridge 24. A channel 25 enters between the parts 22 and 23 upon the side opposite to the bridge 24. It forks inside of the button 21 around the bridge 24 into branch channels 26 and 27, which are shaped to clear the rows of links 7 and 8, respectively. Parts 22 and 23 are spaced apart by the bridge 24 to offer clearance for the goods or tapes 11 and 12, side by side.

In passing from the branch channels 26 and 27 into the main channel 25 the rows of links 7 and 8 are oppositely kinked so that they fan or gape at their blunt ends 14, and that blunt head 14 of a link may enter and nestle between adjacent links of the other row, in which position it leaves the button from the main channel 24 as part of the coupled separable fastener.

Except for a reentering portion or dent 31 and a registering corresponding extension 32 of the sheet surface of the blunt head 34, the sheet material embodiment 33 of the Figs. 4–6 may generally be termed a shell type execution of the lug illustrated in connection with embodiments of Figs. 1–3. In the end of a link 33 opposite to its head 34 key slot 35 serves to close over the beaded selvage 36b of a tape or material 37b. The tongue 38, as a portion struck up in forming the slot 35 may serve as a stay for the link against which the edge of goods or tapes 37b abuts and it may also be found useful for spacing apart the links or shells 33 on one of the stringers. If so desired, the blunt head of one link may nest in the coupled position in the corner formed between the tongue 38 on the bottom of a link of the other row, for which purpose, in order to preserve the relative angle of the links of the two rows, the projection 32 would have to be extended further up and the links of each row should be correspondingly spaced at a slightly greater lead. If, on the other hand, flexibility in the coupled position is to be emphasized, I may limit contact with the surface of a link of the other row to the opposite complementary circular, or rather in a three-dimensional sense cylindrical portion 39 of the edge, projection 32 serving in this instance merely as a key delimiting relative movement of the interlocked link. If we omit projection 32 altogether, and likewise the dent 31, the separable fastener may be flexed until adjacent links of a row strike each other, in which case we reapproach the arrangement of Figs. 1–3.

We thus learn that the central portion of a device of this invention, be it in the embodiment of Figs. 1–3 or of Figs. 4–6, or be it dented or undented, does not necessarily have to be provided at all for the particular mechanical functions of the instant device. If such central portion is omitted altogether, the device is a loop with a generally convex outer surface, and may have a concave inner surface in conformity with the embodiment of Figs. 4–6 in which case the filament of the loop is concave-convex.

Such a loop embodiment of the invention may be elastic, and will thus facilitate the nestling which, as a function, underlies this invention. But when I close the top side of such a loop, it becomes rigid in part at least, and structurally stronger, allowing the use of a much thinner sheet of material.

Having thus described my invention in detail, yet I do not wish to be limited thereby, except as the state of the art and the appended claims may require, for it is obvious that various modifications and changes may be made in the form of embodiment of my invention, without departing from the spirit and scope thereof.

What I claim is:

1. A separable fastener having rows of similar, inclined links, each link being a unit adapted for mounting at one end, being blunt and heavier at the other end than near said one end, and having a lateral cavity adapted to receive the blunt end of a similar link.

2. A separable fastener having rows of similar, inclined links, each link being a unit adapted for mounting at one end, being blunt at the other end, and having a lateral cavity adapted to receive the blunt end of a similar link, each link being curvilinear throughout.

3. A separable fastener having rows of similar, inclined links, each link being a unit adapted for mounting at one end, being blunt at the other end, and having a lateral cavity adapted to receive the blunt end of a similar link, each link being, except for said cavity, convexly curvilinear throughout.

4. A separable fastener having rows of similar, inclined links, each link being a unit adapted for mounting at one end, being blunt and curvilinear at the other end, and having a lateral cavity adapted to receive the blunt end of a similar link, said cavity having a curved front edge adapted for line contact with such similar link in a coupled position, such similar link being revolvable in the coupled position while remaining in line contact with said curved front edge.

5. A separable fastener having rows of similar, inclined links, each link being a unit adapted for mounting at one end, being blunt and curvilinear at the other end, and having a lateral cavity adapted to receive the blunt end of a similar link and to seat such similar link in ball socket fashion.

6. A separable fastener having rows of similar, inclined links, each link being a unit adapted for mounting at one end, and having a lateral cavity adapted to receive the end of a similar link, so that the coupled links may relatively move about an axis substantially extending normal to the extent of the rows of links in the plane of the goods interlocked thereby.

7. A separable fastener comprising interlockable rows of links, each separate link being closed by a continuous, convex surface on one side, having a recess in the other side, and extending in an interlocked position endwise into a corresponding recess of a link of the other row at an obtuse angle and conversely accommodating another link of the other row.

8. A separable fastener comprising interlockable rows of links, each separate link being closed by a continuous, convex surface on one side, having a recess in the other side, and extending in an interlocked position endwise into a corresponding recess of a link of the other row at an obtuse angle and conversely accommodating another link of the other row, said links of the other row being revolvable about substantially parallel axes on said separable link when interlockedly positioned thereon.

9. A separable fastener comprising a pair of symmetrical, interlockable rows of inclined links, each link having a sheet material enclosure which is continuous on all sides but for an opening on its bottom side, said enclosure having an edge at the front of the opening which is in line contact with the top surface of a similar link of the other row when such link of the other row extends endwise into said opening in an interlocked position.

10. As links of the stringers of a separable fastener, substantially ovoidal elements each having a recess on one side, said recess seating a similar element endwise projecting thereinto at an obtuse angle of the axes at the elements in a coupled position of the links.

11. As links of the stringers of a separable fastener, substantially ovoidal elements each having a recess on one side, said recess serving as a universal socket for a similar element endwise projecting thereinto at an obtuse angle of the axes at the elements in a coupled position of the links.

12. Inclinedly strung links of a separable fastener each having substantially the shape of a hemi-ovoid and having a recess upon the underside shaped to seat the top side of a link coupled therewith at an obtuse angle between the respective undersides.

13. Inclinedly strung links of a separable fastener each having substantially the shape of a hemi-ovoid and having a recess upon the underside shaped to seat the top side of a link coupled therewith at an obtuse angle between the respective undersides, the smaller ends of the links being adapted to engage over the edge of a sheet material in a position in which said undersides extend normal to said material.

14. Inclinedly strung links of a separable fastener each having substantially the shape of a hemi-ovoid and having a recess upon the underside shaped to seat the top side of a link coupled therewith at an obtuse angle between the respective undersides, the smaller ends of the links being keyed to fit the beaded edge of a sheet material in a position in which said undersides extend normal to said material.

15. A separable fastener having mounted rows of similar links adapted to be coupled and uncoupled along a central line, a link of each row extending from an edge of goods supporting same between a pair of links of the other row when coupled, each link having in the direction of said line its largest dimension where it extends beyond said line.

16. A separable fastener having mounted rows of similar links adapted to be coupled and uncoupled along a central line, a link of each row extending from an edge of goods supporting same between a pair of links of the other row when coupled, each link extending across said line and having a portion widening out where it crosses said line.

17. A separable fastener having mounted rows of similar links adapted to be coupled and uncoupled along a central line, a link of each row extending from an edge of goods supporting same between a pair of links of the other row when coupled, each link extending across said line and having a portion widening out where it crosses said line, said portions being wedged between adjacent links of the other row.

18. A separable fastener having mounted rows of similar links adapted to be coupled and uncoupled along a central line, a link of each row extending from an edge of goods supporting same between a pair of links of the other row when coupled, each link extending across said line and having a portion flaring substantially spirally out where it crosses said line.

19. A separable fastener having mounted rows of similar links adapted to be coupled and uncoupled, each link extending endwise into and being swingably seated in a link of the other row, when coupled.

20. A separable fastener having mounted rows of similar links adapted to be coupled and uncoupled, each link having a convexly curved top side, and a concavely curved bottom side adapted to receive the end of a link of the other row and to seat the said convexly curved topside of such a link when coupled, said curved top and bottom sides of each link being relatively longitudinally as well as transversely offset.

21. A separable fastener having mounted rows of similar links adapted to be coupled and uncoupled along a central line, each link having a convexly curved top side, and a concavely curved bottom side adapted to receive the end of a link of the other row and to seat the said convexly curved topside of such a link when coupled, said curved top and bottom sides of each link being relatively transversely offset towards opposite sides of said central line.

22. A separable fastener having mounted rows of similar links adapted to be coupled and uncoupled along a central line, each link having a convexly curved top side, and a concavely curved bottom side adapted to receive the end of a link of the other row and to seat the said convexly curved topside of such a link when coupled, said curved top and bottom sides of each link being relatively transversely offset towards opposite sides of said central line, said concavely curved bottom side being on that side of said line where the respective link is mounted.

NICOLAS WAHL.